H. COTTRELL.
MACHINES FOR SAWING STONE.

No. 194,957. Patented Sept. 11, 1877.

Witnesses:
Marcus P. Bestow
William J. Mann

Inventor
Herbert Cottrell.

H. COTTRELL.
MACHINES FOR SAWING STONE.

No. 194,957. Patented Sept. 11, 1877.

Witnesses:
Marcus P. Bestow
William J. Mann

Inventor
Herbert Cottrell

UNITED STATES PATENT OFFICE.

HERBERT COTTRELL, OF NEWARK, NEW JERSEY.

IMPROVEMENT IN MACHINES FOR SAWING STONE.

Specification forming part of Letters Patent No. 194,957, dated September 11, 1877; application filed January 31, 1877.

*To all whom it may concern:*

Be it known that I, HERBERT COTTRELL, of the city of Newark, county of Essex, State of New Jersey, have invented certain Improvements in Machinery for Sawing Stone, of which the following is a specification:

My invention relates to stone-sawing by a diamond-toothed vertical saw, or gang of saws; and the machine hereinafter described is designed to provide such vertical diamond-toothed saw or saws with a constant-feed mechanism, by means of which continuous cutting may be accurately performed.

My object has been to adapt the machine to cut through stones of any length, the continuous feed carrying forward one stone after another, and constantly supplying food to the saw, thus obviating the necessity of stopping the saw at all, or of running the carrying-racks back to reload, by grouping the saws in gangs.

Slabs may be cut of any required thickness, and thus each stone is cut into the requisite number of slabs by one passage of the carrying-racks, and can be followed immediately by others without interruption of the cutting.

I employ a main frame, constructed upon a suitable bed-frame or foundation, and made to admit of the operation of two inner saw-frames, connected by a walking-beam, in such a manner that the weight of one frame balances the weight of the other.

In the said bed-frame are provided a series of grooved rollers, made to support and transmit a number of carrying-racks. The stone to be cut rests upon these carrying-racks, and, by means of the feed-movement, is carried to the saws. This feed-movement consists, preferably, of a pair of cone-pulleys, which may be driven by means of belt-connection with the prime mover, by means of which variable speed is imparted to a worm and worm-gear. This worm and worm-gear rotates the feed-shaft through one or more pinions, as may be required, to give it proper speed. Pinions having roller-surfaces are provided upon said feed-shaft in proper line with the grooved rollers, and adapted to transmit the above-mentioned carrying-racks, thus carrying the stone to the saw at the required rate of speed for properly cutting the same.

Blades formed of a web of steel, perforated at each end and along one edge to admit of rivets passing through, are stretched vertically in the before-mentioned saw-frames, and are drawn to extreme tension by means of a micrometer-screw on one end of each blade.

The tension may be equally attained by means of a yoke and wedges upon one end of the blade. Diamond-armed cutter-blocks are used as teeth, and are made to clasp said blades, and are attached thereto at intervals.

The nature of my invention, and the manner in which the same is or may be carried into effect, will be understood by reference to the accompanying drawing.

Figure 1 represents a vertical section of said machine on the line $x$ $x$, Fig. 2. A $a$ $a$ $a$, the main frame; $b$ $b$, the saw-frames; C, the walking-beam, showing the connection with the saw-frames by the connecting-rods $c$ $c$ at equal distances from the center-shaft $d$, by which they are balanced; D, the connecting-rod which transmits motion from the crank $e$ to the walking-beam C. Upon the same shaft with crank $e$ is a cone-pulley, F, which transmits motion to cone-pulley $f$, attached to main frame A; thence through a worm and worm-gear, $g$, to the feed-shaft $h$ $h$. $i$ $i$ $i$ $i$ are the saws, stretched within frames $b$ $b$. At $j$ $j$ $j$ $j$ are applied the micrometer screw or yoke and wedges, by which the tension is obtained.

In Fig. 2, J J is the bed-frame, within which are the idler-rollers $k$ $k$, &c., which serve to transmit the carrying-racks K to the feed-shaft $h$ by means of the pinions $l$ on the feed-shaft $h$.

Figure 1:
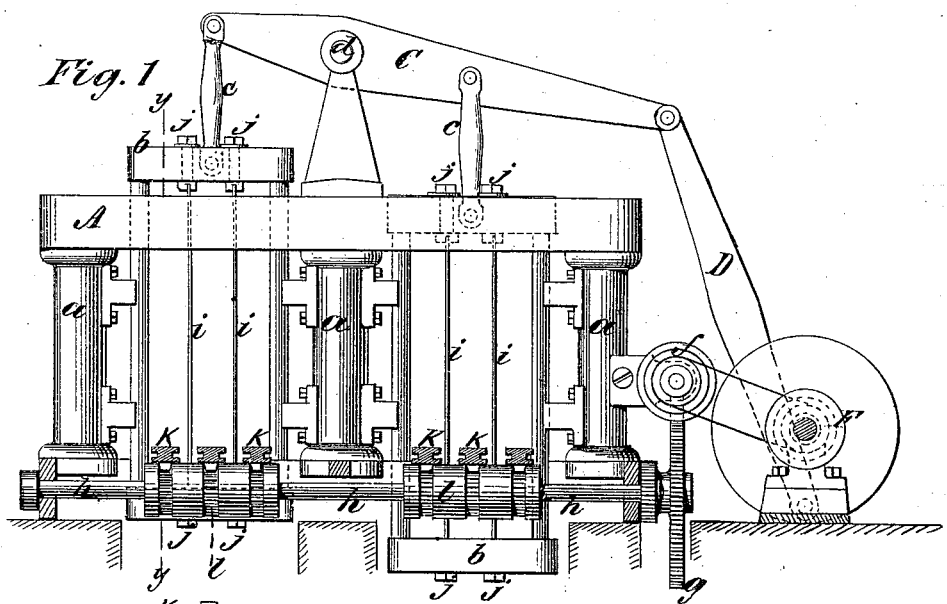
Figure 2:
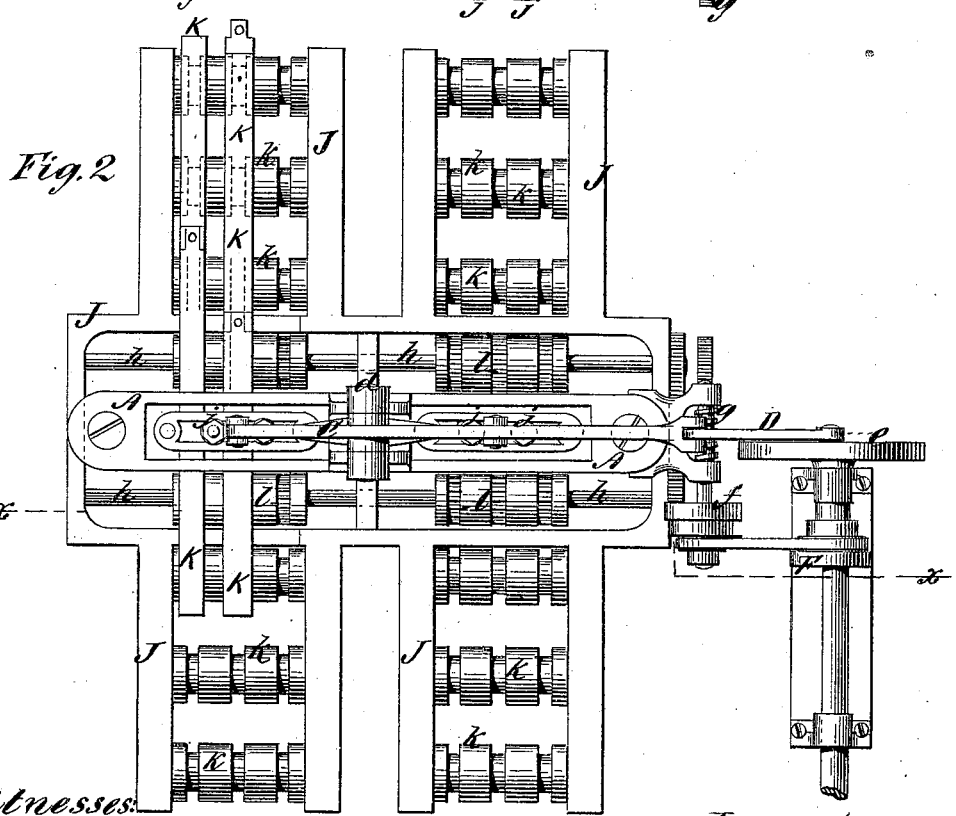
Figure 3:
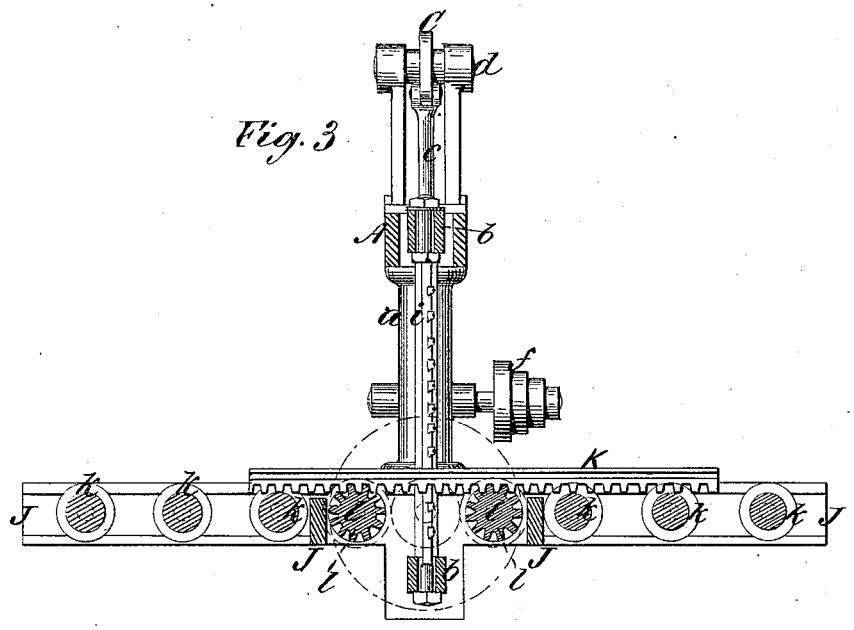
Fig. 3 represents a transverse section on the line $y$ $y$, Fig. 1.
Figure 4:
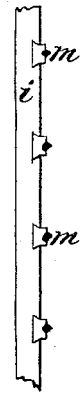
Fig. 4 represents detached blade of saw $i$, with cutters $m$ attached at intervals.

What I claim, and desire to secure by Letters Patent, is—

In combination with the vertical diamond-toothed saw, the continuous-feed mechanism, substantially as shown and set forth.

HERBERT COTTRELL.

Witnesses:
ROBT. N. PRESTIDGE,
WILLIAM J. MANN.